(12) United States Patent
Sakamoto et al.

(10) Patent No.: US 11,462,963 B2
(45) Date of Patent: Oct. 4, 2022

(54) ELECTRIC PUMP DEVICE AND ATTACHMENT STRUCTURE OF ELECTRIC PUMP DEVICE

(71) Applicant: NIDEC TOSOK CORPORATION, Kanagawa (JP)

(72) Inventors: Hitoshi Sakamoto, Kanagawa (JP); Koji Higuchi, Kanagawa (JP); Kunihiro Kajita, Kanagawa (JP); Tomokazu Ikeda, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 281 days.

(21) Appl. No.: 16/813,758

(22) Filed: Mar. 10, 2020

(65) Prior Publication Data
US 2020/0309156 A1    Oct. 1, 2020

(30) Foreign Application Priority Data

Mar. 29, 2019 (JP) .............................. JP2019-068751

(51) Int. Cl.
*F04D 29/66* (2006.01)
*H02K 1/16* (2006.01)
(Continued)

(52) U.S. Cl.
CPC ............... *H02K 5/04* (2013.01); *F04C 2/102* (2013.01); *F04C 15/008* (2013.01); *F04D 13/06* (2013.01);
(Continued)

(58) Field of Classification Search
CPC .... F04C 2240/30; F04C 2/102; F04C 11/008; F04C 15/008; F04C 2210/14;
(Continued)

(56) References Cited

U.S. PATENT DOCUMENTS

2005/0214135 A1* 9/2005 Shibuya .............. F04D 29/0465
417/357
2014/0241917 A1* 8/2014 Suzuki .................... F04C 2/102
417/410.4

(Continued)

FOREIGN PATENT DOCUMENTS

EP       3098382 A1 * 11/2016 .............. F01C 21/10
JP    2011169247 A  *  9/2011 ............ F01C 21/108
JP       5552831        7/2014

*Primary Examiner* — Dominick L Plakkoottam
(74) *Attorney, Agent, or Firm* — JCIPRNET (57) ABSTRACT

An electric pump device includes a motor having a rotor and a stator portions, a pump portion and a housing. The stator portion has a stator core, and coils each having a winding portion and a crossover portion. The housing has a housing body portion having a tubular shape and extending in the axial direction, and a flange portion expanding radially outward from the outer peripheral surface of the housing body portion. The flange portion has an end surface that faces toward one side in the axial direction and is disposed in the axial direction between a first and a second virtual plane. The first and the second virtual planes pass through parts of the stator core, the winding portion, and the crossover portion located respectively closest to one and the other sides in the axial direction and expanding in a direction perpendicular to a central axis.

16 Claims, 8 Drawing Sheets

(51) Int. Cl.
  *H02K 1/22* (2006.01)
  *H02K 5/04* (2006.01)
  *H02K 7/00* (2006.01)
  *H02K 5/24* (2006.01)
  *F04D 13/06* (2006.01)
  *F04D 29/40* (2006.01)
  *F04C 2/10* (2006.01)
  *F04C 15/00* (2006.01)
  *F04C 11/00* (2006.01)

(52) U.S. Cl.
  CPC ............... *F04D 29/40* (2013.01); *H02K 1/16* (2013.01); *H02K 1/22* (2013.01); *H02K 5/24* (2013.01); *H02K 7/003* (2013.01); *F04C 11/008* (2013.01); *F04C 2240/30* (2013.01); *F04C 2240/40* (2013.01)

(58) Field of Classification Search
  CPC .......... F04C 2210/206; F04C 2230/603; F04C 2240/40; F04C 2240/805; F04C 2270/125; F04C 2/18
  See application file for complete search history.

(56) References Cited

U.S. PATENT DOCUMENTS

2016/0025096 A1* 1/2016 Shi .................... F04D 25/06
                                                 417/423.1
2016/0215776 A1* 7/2016 Tamura ................ F04C 2/102
2019/0316594 A1* 10/2019 Hattori ............... F04D 13/0633

* cited by examiner

ELECTRIC PUMP DEVICE AND ATTACHMENT STRUCTURE OF ELECTRIC PUMP DEVICE

CROSS REFERENCE TO RELATED APPLICATIONS

This application claims the priority benefit of Japanese Patent Application No. 2019-068751, filed on Mar. 29, 2019. The entirety of the above-mentioned patent application is hereby incorporated by reference herein and made a part of this specification.

BACKGROUND

Technical Field

The disclosure relates to an electric pump device and an attachment structure of an electric pump device.

Related Art

In an electric pump unit of patent literature 1 (Japanese Patent No. 5552831), a pump and a pump drive electric motor are integrated with a lid. The electric pump unit is disposed in a recess formed of a bottomed circular hole that opens on the rear surface of a longitudinal wall of a transmission housing. An outward flange of the lid is in contact with the rear surface of the longitudinal wall of the housing around the recess and is fixed by a bolt or the like.

There is room for improvement in terms of suppressing vibration of the electric pump device.

SUMMARY

The disclosure provides an electric pump device and an attachment structure of an electric pump device with which it is possible to suppress vibration of the electric pump device.

In one embodiment of the disclosure, an electric pump device is provided to include a motor having a shaft extending along a central axis, a pump portion driven by the motor, and a housing accommodating the motor and the pump portion. The motor has a rotor portion having the shaft, and a stator portion facing the rotor portion in the radial direction. The stator portion has a stator core being ring-like and centered on the central axis, and a plurality of coils attached to the stator core. The coil has a winding portion wound around a part of the stator core, and a crossover portion connected to the winding portion and connecting the plurality of coils. The housing has a housing body portion having a tubular shape and extending in an axial direction, and a flange portion extending radially outward from an outer peripheral surface of the housing body portion. The flange portion has an end surface facing toward one side in the axial direction. The end surface is disposed in the axial direction between a first virtual plane and a second virtual plane, the first virtual plane passing through a part of the stator core, the winding portion and the crossover portion located closest to one side in the axial direction and expanding in a direction perpendicular to the central axis, the second virtual plane passing through a part of the stator core, the winding portion and the crossover portion located closest to the other side in the axial direction and expanding in the direction perpendicular to the central axis.

In addition, in another embodiment of the disclosure, an attachment structure of the electric pump device is provided to include the above electric pump device, and an attached object to which the electric pump device is attached. The attached object has an attachment surface facing toward the other side in the axial direction and in contact with the end surface of the flange portion, and a recess which is recessed from the attachment surface toward one side in the axial direction and into which the housing body portion is inserted. The inner peripheral surface of the recess faces the outer peripheral surface of the housing body portion with a gap in the radial direction.

According to the electric pump device and the attachment structure of an electric pump device of one aspect of the disclosure, vibration of the electric pump device can be suppressed.

DESCRIPTION OF THE EMBODIMENTS

Figure 1:
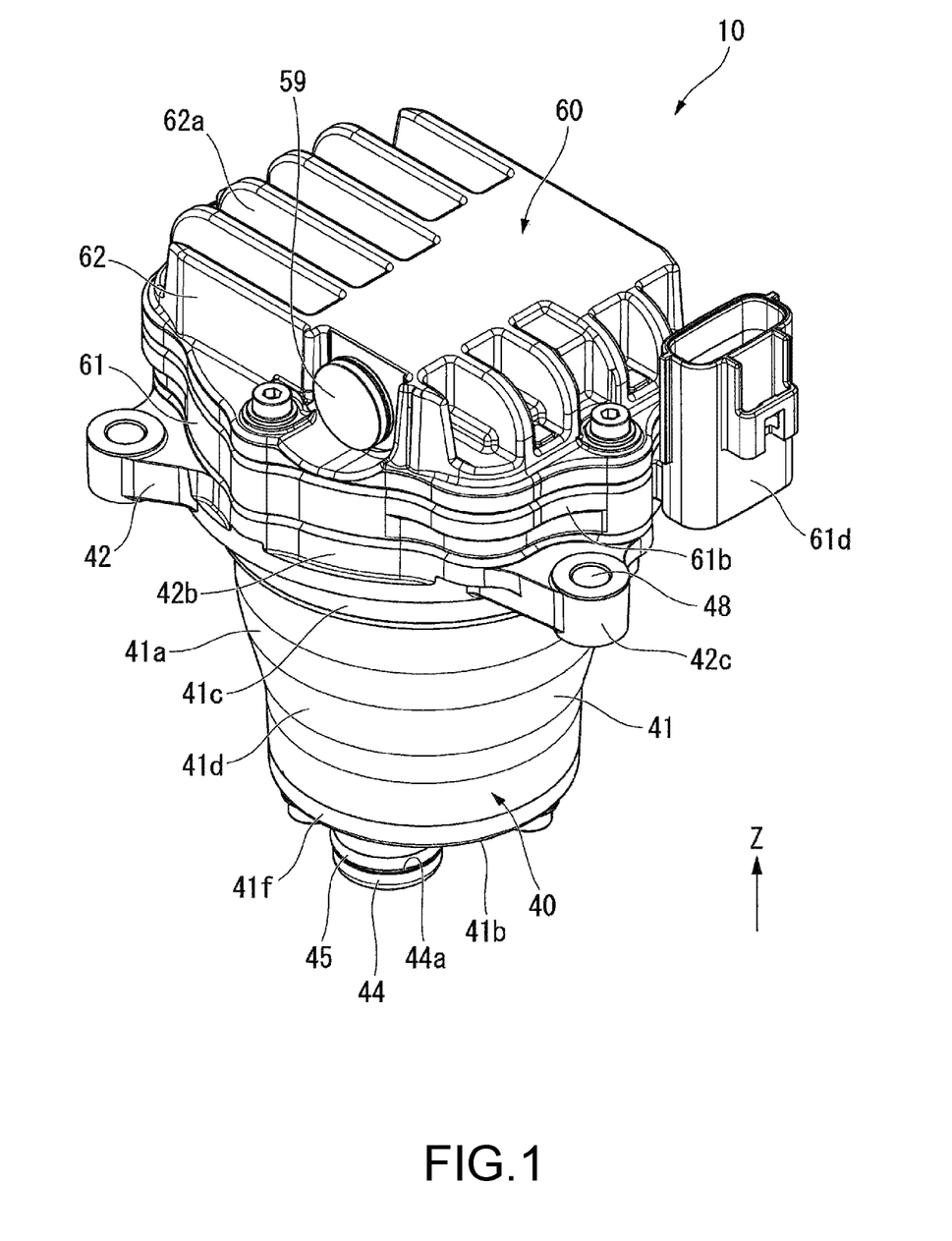
FIG. 1 is a perspective view showing an electric pump device of the embodiment.
Figure 2:
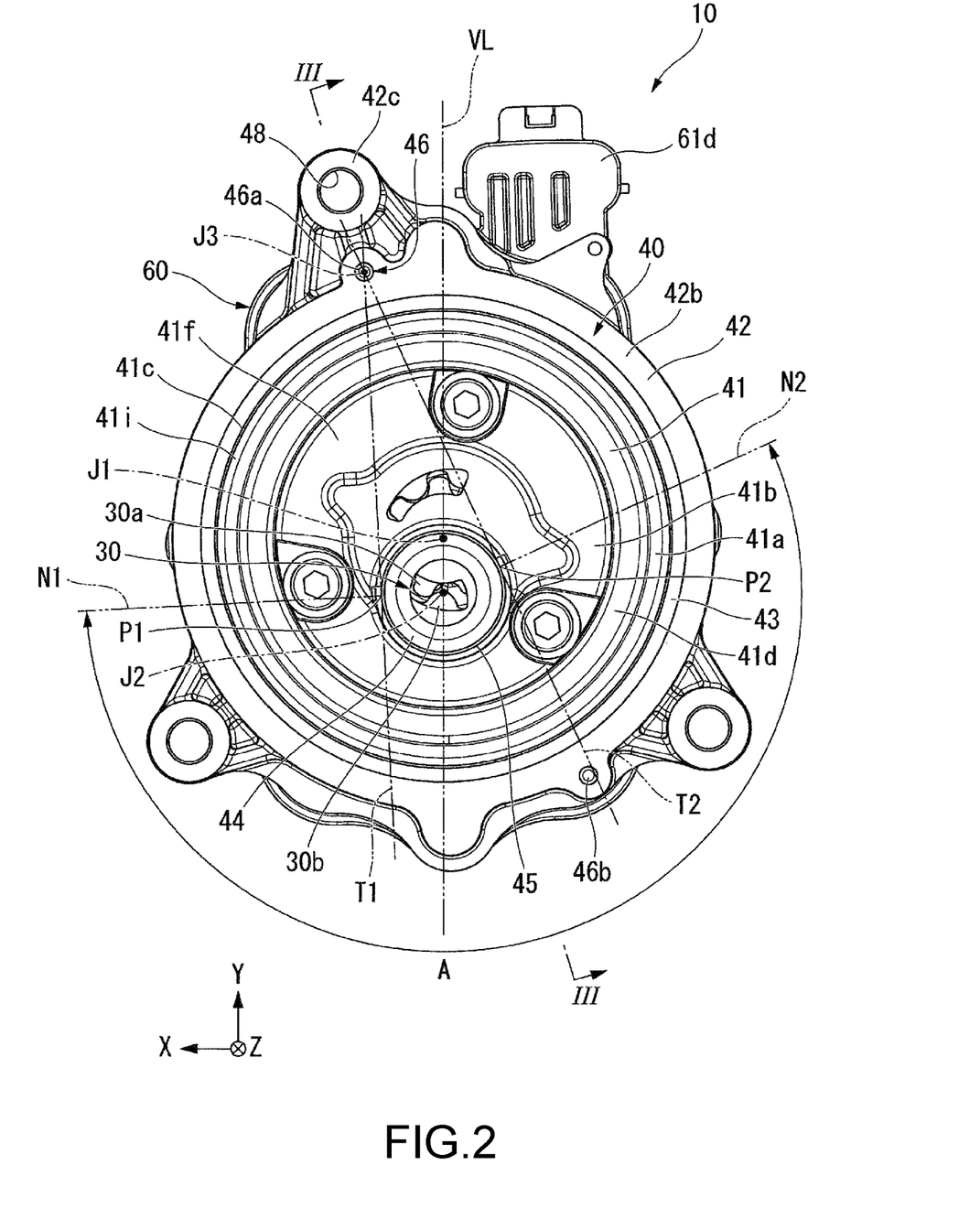
FIG. 2 is a bottom view showing the electric pump device of the embodiment.
Figure 3:
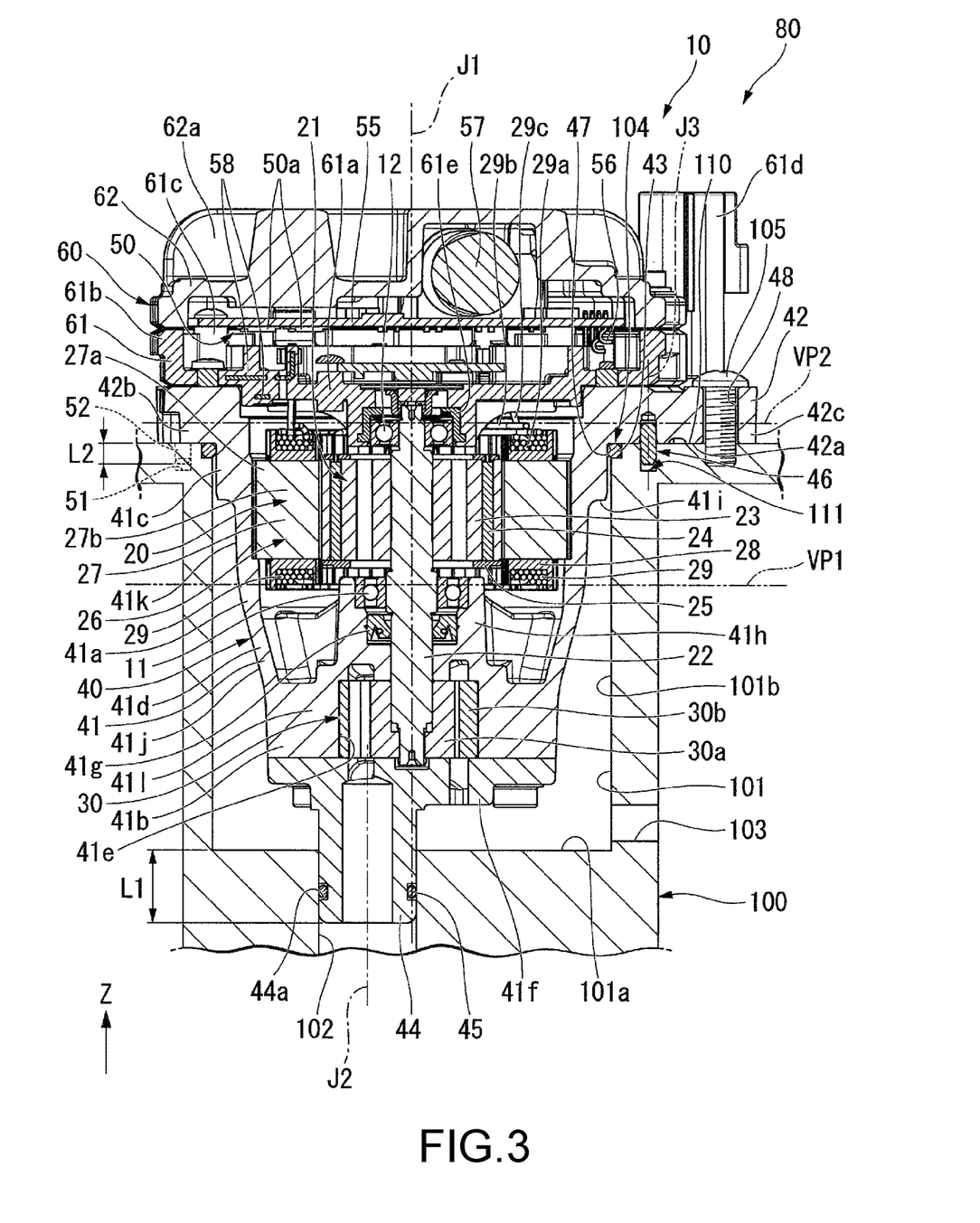
FIG. 3 is a longitudinal cross-section view of the electric pump device and an attachment structure of an electric pump device of the embodiment, showing a cross section III-III of FIG. 2.

An electric pump device 10 and an attachment structure of an electric pump device 80 of one embodiment of the disclosure are described with reference to the diagrams. In the diagrams, an XYZ coordinate system is appropriately shown as a three-dimensional cartesian coordinate system. As shown in FIGS. 1 to 3, the electric pump device 10 includes a motor 20, a pump portion 30, a housing 40, an inverter case 60, a circuit board 55, a wiring member 56, a bus bar 58, an inverter 50, a capacitor 57, and a breather 59. The attachment structure of an electric pump device 80 includes the electric pump device 10, an attached object 100 to which the electric pump device 10 is attached, and a screw member 105.

The motor 20 has a shaft 22 extending along a first central axis J1, and the first central axis J1 extends along the Z-axis direction. Besides, the first central axis J1 may be simply referred to as the central axis J1. In the following description, the direction parallel to the first central axis J1 is simply referred to as an "axial direction". In the embodiment, the axial position of the motor 20 and the axial position of the inverter 50 are different from each other. In other words, the motor 20 and the inverter 50 are disposed at different positions in the axial direction. Within the axial directions, the direction from the inverter 50 toward the motor 20 is referred to as one side in the axial direction (−Z side), and the direction from the motor 20 toward the inverter 50 is referred to as the other side in the axial direction (+Z side). The X-axis direction is a direction perpendicular to the Z-axis direction. The Y-axis direction is a direction perpendicular to the Z-axis direction and the X-axis direction. The Y-axis direction is an inter-axis direction described later.

The radial direction centered on the first central axis J1 is simply referred to as a "radial direction". Within the radial directions, the direction approaching the first central axis J1 is referred to as a radial inner side, and the direction away from the first central axis J1 is referred to as a radial outer side. The peripheral direction centered on the first central axis J1, that is, the axial periphery of the first central axis J1, is simply referred to as a "peripheral direction". Moreover, in the embodiment, the "parallel direction" includes a substantially parallel direction, and the "perpendicular direction" includes a substantially perpendicular direction.

The electric pump device 10 of the embodiment sucks and discharges a fluid such as oil or the like for example. For example, the electric pump device 10 has a function of circulating a fluid through a flow path. When the fluid is oil, the electric pump device 10 may also be referred to as an electric oil pump device. In the embodiment, the electric pump device 10 is attached to the attached object 100 that is a casing of a drive device for vehicle. In other words, the electric pump device 10 is mounted on a vehicle.

The attached object 100 has an attachment surface 110, a recess 101, an import 102, an out port 103, and a corner portion 104. The attachment surface 110 faces toward the other side in the axial direction. The recess 101 is recessed from the attachment surface 110 toward one side in the axial direction. The recess 101 has a bottomed circular hole shape. The import 102 opens on a bottom surface 101a of the recess 101 and extends in the axial direction. The import 102 has a circular hole shape. The out port 103 opens to the inside of the recess 101 at a position different from that of the import 102. In the embodiment, the out port 103 opens on an inner peripheral surface 101b of the recess 101. The corner portion 104 has a ring shape extending in the peripheral direction, and is a connection part between the inner peripheral surface 101b of the recess 101 and the attachment surface 110. The corner portion 104 has an annular shape. The electric pump device 10 sucks oil from the import 102 and discharges the oil from the out port 103 by the pump portion 30.

The motor 20 has a rotor portion 21, a stator portion 26, and a plurality of bearings 11, 12. The rotor portion 21 has a shaft 22, a rotor core 23, a magnet 24, and a magnet holder 25.

The shaft 22 extends in the axial direction about the first central axis J1. The shaft 22 rotates about the first central axis J1. The shaft 22 is supported by the plurality of bearings 11, 12 to be rotatable around the first central axis J1. In other words, the plurality of bearings 11, 12 support the shaft 22 in a rotatable manner. The plurality of bearings 11, 12 are, for example, ball bearings or the like. Within the plurality of bearings 11, 12, the first bearings 11 support a part of the shaft 22 that is located closer to one side in the axial direction than the rotor core 23. Within the plurality of bearings 11, 12, the second bearings 12 support a part of the shaft 22 that is located closer to the other side in the axial direction than the rotor core 23.

The rotor core 23 is fixed to the outer peripheral surface of the shaft 22. The rotor core 23 has a ring shape centered on the first central axis J1. The rotor core 23 has a tubular shape extending in the axial direction. The rotor core 23 is configured, for example, by laminating a plurality of electromagnetic steel plates in the axial direction.

The magnet 24 is disposed at the radial outer end of the rotor core 23. In the embodiment, the magnet 24 is an embedded magnet. Besides, the magnet 24 may also be a surface magnet. A plurality of magnets 24 are arranged. The plurality of magnets 24 are disposed at the radial outer end of the rotor core 23 with intervals therebetween in the peripheral direction. Besides, the magnet 24 may be, for example, one cylindrical ring magnet.

The magnet holder 25 is arranged on the rotor core 23 and holds the magnet 24. In the embodiment, the magnet holder 25 prevents the magnet 24 from slipping out of the rotor core 23 in the axial direction. The magnet holder 25 is disposed on the radial outer surface of the rotor core 23, and is disposed on the surfaces facing toward one side in the axial direction and the other side in the axial direction.

The stator portion 26 is disposed on the radial outer side of the rotor portion 21, and faces to the rotor portion 21 with a gap in the radial direction. In other words, the stator portion 26 is faces the rotor portion 21 in the radial direction. The stator portion 26 surrounds the rotor portion 21 from the radial outer side over the entire periphery in the peripheral direction. The stator portion 26 has a stator core 27, an insulator 28, and a plurality of coils 29.

The stator core 27 has a ring shape centered on the first central axis J1. The stator core 27 surrounds the rotor portion 21 from the radial outer side. The stator core 27 is disposed on the radial outer side of the rotor portion 21, and faces the rotor portion 21 with a gap in the radial direction. The stator core 27 is configured, for example, by laminating a plurality of electromagnetic steel plates in the axial direction.

The stator core 27 has a core back 27a and a plurality of teeth 27b. The core back 27a has a ring shape centered on the central axis. The core back 27a has a tubular shape extending in the axial direction. The radial outer surface of the core back 27a is fixed to the inner peripheral surface of the housing 40. The core back 27a is fitted into the housing 40. The teeth 27b extend radially inward from the radial inner surface of the core back 27a. The plurality of teeth 27b are disposed on the radial inner surface of the core back 27a with intervals therebetween in the peripheral direction.

The insulator 28 is mounted on the stator core 27. The insulator 28 has a part covering the teeth 27b. The material of the insulator 28 is, for example, an insulating material such as resin or the like.

The plurality of coils 29 is attached to the stator core 27 via the insulator 28. In other words, the plurality of coils 29 is attached to the stator core 27. The plurality of coils 29 is respectively configured by winding a conductive wire around each tooth 27b via the insulator 28.

Although not particularly shown, the plurality of coils 29 has a first coil, a second coil, and a third coil. The first coil has a first conductive wire. The second coil has a second conductive wire different from the first conductive wire. The third coil has a third conductive wire different from the first conductive wire and the second conductive wire. The first coil, the second coil, and the third coil are different from each other in terms of phase. In the embodiment, the motor 20 is a three-phase motor. The three phases are U-phase, V-phase and W-phase. In the case of a three-phase motor, the conductive wires constituting the U-phase, V-phase, and W-phase coils 29 are different from each other. That is, the conductive wire of the U-phase coil 29, the conductive wire of the V-phase coil 29, and the conductive wire of the W-phase coil 29 are different from each other.

The coil 29 has a winding portion 29a wound around a part of the stator core 27, a crossover portion 29b connected to the winding portion 29a and connecting the plurality of coils 29, and a drawing wire portion 29c connected to the winding portion 29a and connecting the coil 29 and the bus bar 58. The winding portion 29a is configured by winding a conductive wire around the tooth 27b via the insulator 28. The crossover portion 29b connects the plurality of winding portions 29a formed of a single conductive wire. The crossover portion 29b is disposed on the other side in the axial direction or one side in the axial direction of the stator core 27. The crossover portion 29b has a part extending along a virtual plane (not shown) perpendicular to the first central axis J1. The drawing wire portion 29c is drawn from the winding portion 29a to the other side in the axial direction, and is connected to the circuit board 55 via the bus bar 58.

The pump portion 30 is driven by the motor 20. The pump portion 30 is disposed closer to one side in the axial direction than the stator portion 26. The pump portion 30 is connected to the rotor portion 21. In the embodiment, the pump portion 30 has a structure of a trochoid pump. The pump portion 30 has an inner rotor 30a and an outer rotor 30b located on the radial outer side of the inner rotor 30a. The inner rotor 30a and the outer rotor 30b are pump gears and are engaged with each other. The inner rotor 30a and the outer rotor 30b respectively have a trochoid tooth profile. The inner rotor 30a is fixed to the end of the shaft 22 on one side in the axial direction. The motor 20 rotates the inner rotor 30a to drive the pump portion 30.

The housing 40 accommodates the motor 20 and the pump portion 30. The housing 40 has a housing body portion 41, a protrusion portion 44, a seal portion 43, and a flange portion 42 expanding radially outward from the outer peripheral surface of the housing body portion 41.

The motor 20 and the pump portion 30 are accommodated in the housing body portion 41. The housing body portion 41 has a tubular shape and extends in the axial direction. The housing body portion 41 has a bottomed tubular shape. The housing body portion 41 has a peripheral wall portion 41a and a bottom portion 41b. The stator core 27 is fitted into the peripheral wall portion 41a. The bottom portion 41b closes the end of the peripheral wall portion 41a on one side in the axial direction. As shown in FIG. 3, the housing body portion 41 is inserted into the recess 101 of the attached object 100. The inner peripheral surface 101b of the recess 101 faces the outer peripheral surface of the housing body portion 41 with a gap in the radial direction.

The housing body portion 41 has a cylindrical portion 41c, a stepped surface 41i, a sloped portion 41d, a pump accommodation wall portion 41l, a pump accommodation hole 41e, a bearing holding tube 41h, a pump cover 41f, and an oil seal 41g. The cylindrical portion 41c, the stepped surface 41i, and the sloped portion 41d are arranged in the peripheral wall portion 41a. The pump accommodation wall portion 41l, the pump accommodation hole 41e, the bearing holding tube 41h, the pump cover 41f, and the oil seal 41g are arranged in the bottom portion 41b.

The cylindrical portion 41c is disposed at the end of the housing body portion 41 on the other side in the axial direction. The cylindrical portion 41c has a cylindrical shape centered on the first central axis J1. The cylindrical portion 41c extends in the axial direction. The outer peripheral surface of the cylindrical portion 41c is connected to an end surface 42a of the flange portion 42 facing toward one side in the axial direction. The stepped surface 41i is an annular surface centered on the first central axis J1 and faces toward one side in the axial direction. The outer peripheral portion of the stepped surface 41i is connected to the end of the cylindrical portion 41c on one side in the axial direction.

The sloped portion 41d is located closer to one side in the axial direction than the flange portion 42. The sloped portion 41d is located closer to one side in the axial direction than the cylindrical portion 41c and the stepped surface 41i. The end of the sloped portion 41d on the other side in the axial direction is connected to the inner peripheral portion of the stepped surface 41i. The sloped portion 41d is disposed in a part of the peripheral wall portion 41a other than the end on the other side in the axial direction.

The sloped portion 41d decreases in the outer diameter toward one side in the axial direction. In the embodiment, as shown in FIG. 3, in a longitudinal cross-section view along the first central axis J1, an inclination angle of a part 41j of the sloped portion 41d located on one side in the axial direction with respect to the first central axis J1 is larger than an inclination angle of a part 41k of the sloped portion 41d located on the other side in the axial direction with respect to the first central axis J1. That is, in the longitudinal cross-section view, the amount of displacement (in other words, the inclination) toward the radial direction per unit length along the axial direction in the part 41j of the sloped portion 41d located on one side in the axial direction is larger than the amount of displacement toward the radial direction per unit length along the axial direction in the part 41k of the sloped portion 41d located on the other side in the axial direction.

According to the embodiment, since the housing body portion 41 has the sloped portion 41d, a gap can be arranged between the inner peripheral surface 101b of the recess 101 of the attached object 100 and the sloped portion 41d. In addition, this gap is larger than a gap between the inner peripheral surface 101b of the recess 101 and the cylindrical portion 41c. That is, in the embodiment, since a gap is arranged between the outer peripheral surface of the housing body portion 41 and the inner peripheral surface 101b of the recess 101 and oil can flow through the gap, an effect of cooling the motor 20 by the oil is obtained.

The pump accommodation wall portion 41l is connected to the end of the sloped portion 41d on one side in the axial direction. The pump accommodation wall portion 41l closes the end of the peripheral wall portion 41a on one side in the axial direction. The pump accommodation wall portion 41l has a disk shape in which the plate surface faces toward the axial direction.

The pump accommodation hole 41e is recessed from a plate surface of the pump accommodation wall portion 41l facing toward one side in the axial direction to the other side in the axial direction. In the embodiment, the pump accommodation hole 41e has a topped circular hole shape. The pump portion 30 is disposed in the pump accommodation hole 41e. The bearing holding tube 41h has a tubular shape extending from the pump accommodation wall portion 41l to the other side in the axial direction. The bearing holding tube 41h protrudes from a plate surface of the pump accommodation wall portion 41l facing toward the other side in the axial direction to the other side in the axial direction. The bearing holding tube 41h holds the first bearing 11. The first bearing 11 is fitted into the bearing holding tube 41h.

The pump cover 41f is fixed to the plate surface of the pump accommodation wall portion 41l facing toward one side in the axial direction, and covers the pump portion 30 from one side in the axial direction. The oil seal 41g has a ring shape centered on the first central axis J1. The oil seal 41g is disposed in the bearing holding tube 41h, and is located closer to one side in the axial direction than the first bearing 11.

The protrusion portion 44 has a tubular shape extending in the axial direction. The protrusion portion 44 has a cylindrical shape. The protrusion portion 44 may be referred to as a tube. The protrusion portion 44 extends from the bottom portion 41b of the housing body portion 41 toward one side in the axial direction. In the embodiment, the protrusion portion 44 protrudes from the pump cover 41f toward one side in the axial direction. The protrusion 44 extends in the axial direction around a second central axis J2. The second central axis J2 of the protrusion portion 44 is arranged at a position that is radially deviated from the first central axis J1. The second central axis J2 and the first central axis J1 extend parallel to each other.

The protrusion portion 44 is inserted into and comes into contact with the import 102. In other words, the protrusion portion 44 is inserted into the import 102. The protrusion portion 44 has a groove portion 44a and an elastic ring member 45. The groove portion 44a is disposed on the outer peripheral surface of the protrusion portion 44 and extends around the second central axis J2. The groove portion 44a is a ring-like groove centered on the second central axis J2. The elastic ring member 45 has a ring shape fitted onto the outer peripheral surface of the protrusion portion 44 and can be elastically deformed. The elastic ring member 45 is, for example, an O-ring or the like. The elastic ring member 45 is disposed in the groove portion 44a and extends around the second central axis J2.

In the embodiment, as shown in FIG. 2, when the housing 40 is viewed from the axial direction, the direction in which a virtual straight line VL passing through the first central axis J1 and the second central axis J2 extends is defined as an inter-axial direction. In FIG. 2, the inter-axis direction is a direction extending along the Y-axis. Within the inter-axis directions, the direction from the second central axis J2 toward the first central axis J1 is +Y side, and the direction from the first central axis J1 toward the second central axis J2 is −Y side.

Figure 4:
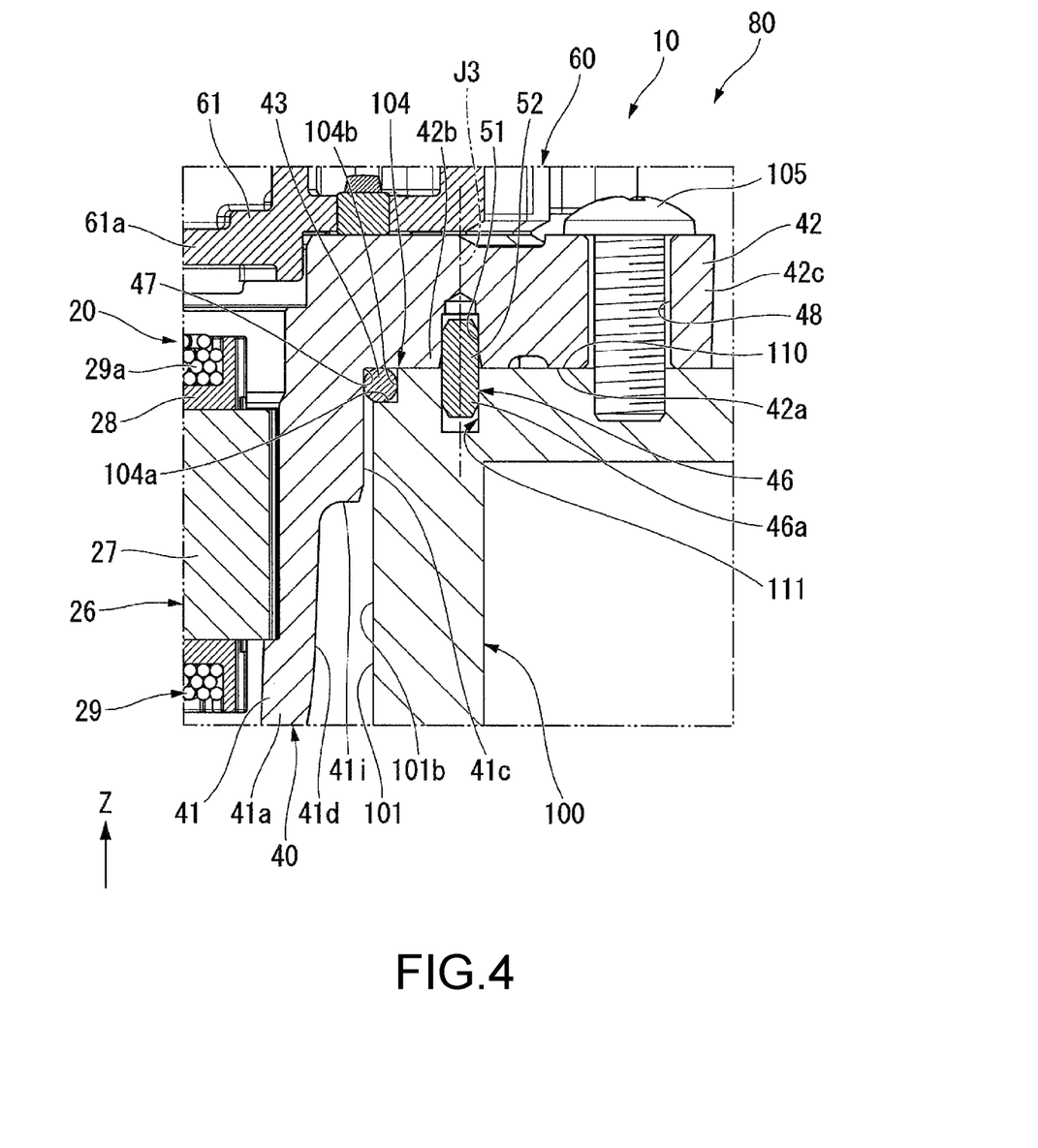
FIG. 4 is a longitudinal cross-section view showing a part of FIG. 3 in an enlarged manner.

The seal portion 43 has a ring shape extending in the peripheral direction. The seal portion 43 has an annular shape centered on the first central axis J1. As shown in FIGS. 3 and 4, the seal portion 43 is disposed in a corner 47 where the outer peripheral surface of the housing body portion 41 and the end surface 42a of the flange portion 42 facing toward one side in the axial direction are connected. In the embodiment, the seal portion 43 has a circular cross-section along the radial direction. The seal portion 43 is, for example, an O-ring or the like, and can be elastically deformed. The seal portion 43 is clamped and disposed between the corner portion 104 and the corner 47. The seal portion 43 seals the space between the corner portion 104 and the corner 47. In the embodiment, the corner portion 104 has a bottom wall 104a and an inner peripheral wall 104b.

The bottom wall 104a is located closer to one side in the axial direction than the attachment surface 110 and faces toward the other side in the axial direction. The bottom wall 104a has a planar shape expanding in a direction perpendicular to the central axis (corresponding to the first central axis J1) of the recess 101. The bottom wall 104a has a ring shape centered on the central axis of the recess 101. The inner peripheral wall 104b is located radially outside of the inner peripheral surface 101b of the recess 101 and faces toward the radial inner side. The inner peripheral wall 104b has a ring shape centered on the central axis of the recess 101. The end of the inner peripheral wall 104b on one side in the axial direction and the outer peripheral portion of the bottom wall 104a are connected to each other. According to the embodiment, the seal portion 43 is clamped and disposed between the bottom wall 104a and the inner peripheral wall 104b of the corner portion 104 of the attached object 100 and the corner 47 of the housing 40. Processing of the corner portion 104 is easy, and the seal performance of the seal portion 43 is stable.

As shown in FIGS. 1 to 4, the flange portion 42 has a flange portion body 42b and an attachment portion 42c. The flange portion body 42b has an annular shape centered on the first central axis J1. The attachment portion 42c protrudes radially outward from the flange portion body 42b. In the embodiment, a plurality of attachment portions 42c is arranged with intervals therebetween in the peripheral direction. Each attachment portion 42c is fixed to the attachment surface 110 of the attached object 100 by the screw member 105.

The flange portion 42 has the end surface 42a facing toward one side in the axial direction, a positioning portion 46, a hole portion 51, a pin portion 52, and an attachment hole 48. The end surface 42a is disposed across the flange portion body 42b and the attachment portion 42c. The end surface 42a has a planar shape expanding in the direction perpendicular to the first central axis J1. The attachment surface 110 comes into contact with the end surface 42a. The attachment surface 110 has a planar shape expanding in a direction perpendicular to the central axis of the recess 101.

As shown in FIG. 3, the end surface 42a is disposed in the axial direction between a first virtual plane VP1 and a second virtual plane VP2, the first virtual plane VP1 passing through a part of the stator core 27, the winding portion 29a and the crossover portion 29b located closest to one side in the axial direction and expanding in the direction perpendicular to the first central axis (the central axis) J1, the second virtual plane VP2 passing through a part of the stator core 27, the winding portion 29a and the crossover portion 29b located closest to the other side in the axial direction and expanding in the direction perpendicular to the first central axis J1. That is, the axial position of the end surface 42a is between the axial position of the part of the stator core 27, the winding portion 29a and the crossover portion 29b located closest to one side in the axial direction and the axial position of the part of the stator core 27, the winding portion 29a and the crossover portion 29b located closest to the other side in the axial direction.

The ratio of the weight of the stator portion 26 to the total weight of the electric pump device 10 is large. Therefore, for example, different from the embodiment, when the gravity center of the stator portion 26 is separate in the axial direction from the surface on which the electric pump device 10 is fixed to the attached object 100, that is, the end surface 42a of the flange portion 42 facing toward one side in the axial direction, the electric pump device 10 vibrates easily.

On the other hand, in the electric pump device 10 of the embodiment, the end surface 42a of the flange portion 42 facing toward one side in the axial direction is disposed in the axial direction in a range of the stator portion 26 where the stator core 27, the winding portion 29a, and the crossover portion 29b are located. The gravity center of the stator portion 26 is located on any of the stator core 27, the winding portion 29a, and the crossover portion 29b. That is, according to the embodiment, the end surface 42a of the flange portion 42 facing toward one side in the axial direction is disposed close to the gravity center of the stator portion 26 in the axial direction. Thereby, vibration of the electric pump device 10 can be suppressed. Specifically, the vibration generated by the operation of the electric pump device 10 can be suppressed. In addition, when the attached object 100 is a casing of a drive device for vehicle as in the embodiment, the vibration generated by the operation of the drive device or vibration generated by the traveling of the vehicle is prevented from causing the electric pump device 10 to vibrate (resonate).

The end surface 42*a* is disposed, in the axial direction, closer to the other side in the axial direction than the stator core 27. According to the embodiment, the end surface 42*a* of the flange portion 42 facing toward one side in the axial direction is disposed in the axial direction in a range of the part of the winding portion 29*a* and the crossover portion 29*b* located closer to the other side in the axial direction than the stator core 27. In this case, the effect of suppressing the vibration of the electric pump device 10 is obtained as described above, and the amount of protrusion of the electric pump device 10 protruding from the attachment surface 110 of the attached object 100 to the other side in the axial direction can be suppressed. Thereby, an installation space for other members can be secured on the other side in the axial direction of the electric pump device 10. In addition, an entire external dimension of the electric pump device 10 and the attached object 100 can be kept small.

Besides, generally, in the configuration in which a gap is arranged between the outer peripheral surface of the housing body portion 41 and the inner peripheral surface 101*b* of the recess 101, the electric pump device 10 may vibrate easily, but according to the embodiment, the surface on which the electric pump device 10 is fixed to the attached object 100, that is, the end surface 42*a* of the flange portion 42 facing toward one side in the axial direction is disposed close to the gravity center of the stator portion 26 in the axial direction, and thus the vibration of the electric pump device 10 can be suppressed.

In addition, in the embodiment, the protrusion portion 44 is inserted into the import 102 of the attached object 100. The elastic ring member 45 is interposed between the outer peripheral surface of the protrusion portion 44 and the import 102, and thereby the seal performance between the protrusion portion 44 and the import 102 is secured, and the elastic ring member 45 functions as a cushioning material (a vibration suppression material) between the electric pump device 10 and the attached object 100. Therefore, the vibration is further suppressed.

The positioning portion 46 is arranged on the end surface 42*a*. In other words, the flange portion 42 has the positioning portion 46 on the end surface 42*a*. The positioning portion 46 is disposed on the flange portion body 42*b*. The positioning portion 46 has a convex shape protruding from the end surface 42*a* toward one side in the axial direction or a hole shape recessed from the end surface 42*a* toward the other side in the axial direction. In the embodiment, the positioning portion 46 has a convex shape protruding from the end surface 42*a* toward one side in the axial direction. Therefore, the positioning portion 46 may also be referred to as a convex portion 46. In other words, the flange portion 42 has the convex portion 46 protruding from the end surface 42*a* toward one side in the axial direction. At least one convex portion 46 is arranged on the flange portion 42. The positioning portion 46 extends in the axial direction about a third central axis J3. The third central axis J3 is parallel to the first central axis J1 and the second central axis J2.

The attachment surface 110 has an attachment surface positioning portion 111 into which the positioning portion 46 is fitted. The attachment surface positioning portion 111 has a hole shape recessed from the attachment surface 110 toward one side in the axial direction or a convex shape protruding from the attachment surface 110 toward the other side in the axial direction. In the embodiment, the attachment surface positioning portion 111 has a hole shape recessed from the attachment surface 110 toward one side in the axial direction. Therefore, the attachment surface positioning portion 111 may also be referred to as an insertion hole 111. In other words, the attachment surface 110 has the insertion hole 111 recessed from the attachment surface 110 toward one side in the axial direction. The positioning portion 46 (the convex portion 46) is inserted into and comes into contact with the attachment surface positioning portion 111 (the insertion hole 111). That is, the positioning portion 46 is inserted into the attachment surface positioning portion 111.

In the electric pump device 10 and the attachment structure of an electric pump device 80 of the embodiment, the seal portion 43 is clamped and disposed between the corner 47 of the housing 40 and the corner portion 104 of the attached object 100. For example, compared with a configuration which is different from the embodiment and in which a ring-like accommodation groove that opens in the axial direction and extends in the peripheral direction is arranged on the end surface 42*a* of the flange portion 42 facing toward one side in the axial direction or the attachment surface 110 of the attached object 100 and the seal portion is accommodated in the accommodation groove, the outer diameter of the flange portion 42 can be kept small according to the embodiment. Therefore, the electric pump device 10 can be reduced in size. In addition, in the embodiment, the diameter of the corner portion 104 of the attached object 100 is smaller than the diameter of the above-described accommodation groove, and thus the vibration width during cutting of the corner portion 104 is kept small, the processing precision such as flatness, perpendicularity or the like is improved, and the seal performance in the corner portion 104 is improved.

In addition, for example, compared with a configuration which is different from the embodiment and in which a ring-like accommodation groove that opens in the radial direction and extends in the peripheral direction is arranged on the outer peripheral surface of the housing body portion 41 or the inner peripheral surface 101*b* of the recess 101 and the seal portion is accommodated in the accommodation groove, the groove processing on the housing 40 is unnecessary in the embodiment and the processing on the corner portion 104 of the attached object 100 is simpler. Therefore, the processing time during manufacture can be shortened, and the manufacturing cost or tact time can be reduced.

Besides, in the embodiment, the positioning portion 46 is arranged on the end surface 42*a* of the flange portion 42 facing toward one side in the axial direction. The positioning portion 46 of the electric pump device 10 is fitted into the attachment surface positioning portion 111 of the attachment surface 110 of the attached object 100, that is, the convex portion 46 of the flange portion 42 is inserted into the insertion hole 111 of the attachment surface 110, and thereby the housing body portion 41 of the electric pump device 10 and the recess 101 of the attached object 100 are disposed coaxially so that the central axes coincide with each other. Thereby, a distance between the corner 47 of the housing 40 and the corner portion 104 of the attached object 100 is constant along the peripheral direction, and the seal performance of the seal portion 43 is stabilized over the entire periphery. Accordingly, it is possible to prevent the seal performance between the electric pump device 10 and the attached object 100 from varying in the peripheral direction and the radial direction. That is, it is possible to prevent the seal performance between the electric pump device 10 and the attached object 100 from varying at each position in the peripheral direction of the seal portion 43 or varying between the radial inner end and the radial outer end of the seal portion 43.

In addition, in the embodiment, it is unnecessary to fit the outer peripheral surface of the housing body portion 41 and the inner peripheral surface 101b of the recess 101 while stabilizing the seal performance as described above, and the freedom degree of relative movement of both members when the electric pump device 10 is attached to the attached object 100 is secured. That is, it is easy to insert and fit the protrusion portion 44 of the housing 40 into the import 102 of the attached object 100, and to insert and fit the positioning portion 46 (the convex portion 46) of the housing 40 into the attachment surface positioning portion 111 (the insertion hole 111) of the attachment surface 110 of the attached object 100. Accordingly, the electric pump device 10 and the attached object 100 are easily assembled. In addition, in a configuration which is different from the embodiment for example and in which the outer peripheral surface of the housing body portion 41 and the inner peripheral surface 101b of the recess 101 are fitted, internal stress may increase or displacement may occur in the stator portion 26 fitted into the housing body portion 41 during the assembly, but in this embodiment, the occurrence of stress in the stator portion 26 is suppressed and the performance of the motor 20 is maintained satisfactory. In addition, by arranging a gap between the outer peripheral surface of the housing body portion 41 and the inner peripheral surface 101b of the recess 101, oil can flow through this gap, and a cooling effect from the oil can be obtained.

As shown in FIG. 2, the positioning portion 46 (the convex portion 46) is disposed closer to a direction of the inter-axis directions from the second central axis J2 toward the first central axis J1 (+Y side) than the protrusion portion 44. According to the embodiment, the positioning portion 46 is disposed at a position of the flange portion 42 separate from the protrusion portion 44. In other words, the distance between the protrusion portion 44 and the positioning portion 46 can be kept large. Therefore, while the distance in the inter-axis direction between the second central axis J2 of the protrusion portion 44 and the third central axis J3 of the positioning portion 46 is kept large, the protrusion portion 44 is fitted into the import 102, and the positioning portion 46 is fitted into the attachment surface positioning portion 111. Thereby, peripheral displacement between the housing 40 of the electric pump device 10 and the recess 101 of the attached object 100 is suppressed and the precision of the peripheral position is improved, and the coaxiality precision between the housing 40 and the recess 101 is increased. The distance between the corner 47 of the housing 40 and the corner portion 104 of the attached object 100 is not prone to vary at each position in the peripheral direction, and the seal performance of the seal portion 43 is further stabilized.

Two positioning portions 46 (convex portions 46) are arranged in the flange portion. According to the embodiment, since two positioning portions 46 are arranged, the coaxiality precision between the housing 40 of the electric pump device 10 and the recess 101 of the attached object 100 is further stabilized. Specifically, for example, compared with a configuration in which only one positioning portion 46 is arranged, the precision of the radial position and the precision of the peripheral position of the housing 40 with respect to the recess 101 of the attached object 100 are improved in this embodiment. In addition, for example, in a configuration in which three positioning portions 46 are arranged, two of the three positioning portions 46 come into contact with the attachment surface positioning portion 111 (the insertion hole 111), but the rest one is hard to come into contact with the attachment surface positioning portion 111, and thus it is difficult to obtain a positioning function in one positioning portion 46. In addition, the fitting tolerance is inevitably increased to respectively fit the three positioning portions 46 into the attachment surface positioning portion 111, and the rattling (gap) after the assembly may increase accordingly and positioning precision may decrease.

In the embodiment, the two positioning portions 46 (the convex portions 46) are a first positioning portion 46a and a second positioning portion 46b. The first positioning portion 46a may also be referred to as the first convex portion 46a. The second positioning portion 46b may also be referred to as the second convex portion 46b. That is, the two convex portions 46 are the first convex portion 46a and the second convex portion 46b. As shown in FIG. 2, when the housing 40 is viewed from the axial direction, two tangents passing through the third central axis J3 of the first positioning portion 46a and in contact with the outer peripheral surface of the protrusion portion 44 are a first tangent T1 and a second tangent T2. When the housing 40 is viewed from the axial direction, a normal line of the first tangent T1 passing through a first contact point which is the contact point between the outer peripheral surface of the protrusion portion 44 and the first tangent T1 and extending from the first tangent T1 toward a direction opposite to the second central axis J2 is a first normal line N1, and a normal line of the second tangent T2 passing through a second contact point P2 which is the contact point between the outer peripheral surface of the protrusion portion 44 and the second tangent T2 and extending from the second tangent T2 toward a direction opposite to the second central axis J2 is a second normal line N2. When the housing 40 is viewed from the axial direction, the second positioning portion 46b is disposed closer to a direction of the inter-axis directions from the first central axis J1 toward the second central axis J2 (−Y side) than the first normal line N1 and the second normal line N2. That is, the second positioning portion 46b is disposed in a range of the flange portion 42 indicated by a symbol A in FIG. 2. In the embodiment, in the flange portion 42, the second positioning portion 46b is disposed between the first tangent T1 and the second tangent T2, on the first tangent T1, or on the second tangent T2.

According to the embodiment, the first positioning portion 46a (the first convex portion 46a) and the second positioning portion 46b (the second convex portion 46b) are easily disposed opposite to each other with the protrusion portion 44 interposed therebetween when viewed from the axial direction. Thereby, the coaxiality precision between the housing 40 of the electric pump device 10 and the recess 101 of the attached object 100 is further improved. Accordingly, the seal performance of the seal portion 43 is further stabilized.

The positioning portion 46 (the convex portion 46) overlaps the inverter case 60 when viewed from the axial direction. The inverter case 60 is disposed on the other side in the axial direction of the housing 40. For example, compared with a configuration which is different from the embodiment and in which the positioning portion 46 is disposed radially outside of the inverter case 60 when viewed from the axial direction, the outer diameter of the flange portion 42 can be kept small in this embodiment. Therefore, the electric pump device 10 can be reduced in size.

As shown in FIG. 3, an axial length L2 at which the positioning portion 46 and the attachment surface positioning portion 111 are fitted, that is, the axial length L2 at which the convex portion 46 is inserted into the insertion hole 111 is smaller than an axial length L1 at which the protrusion portion 44 is inserted into the import 102. According to the embodiment, when the electric pump device 10 and the attached object 100 are assembled, first, the protrusion portion 44 can be fitted into the import 102, and then the positioning portion 46 and the attachment surface positioning portion 111 can be fitted. Therefore, the electric pump device 10 and the attached object 100 are more easily assembled.

Figure 5:
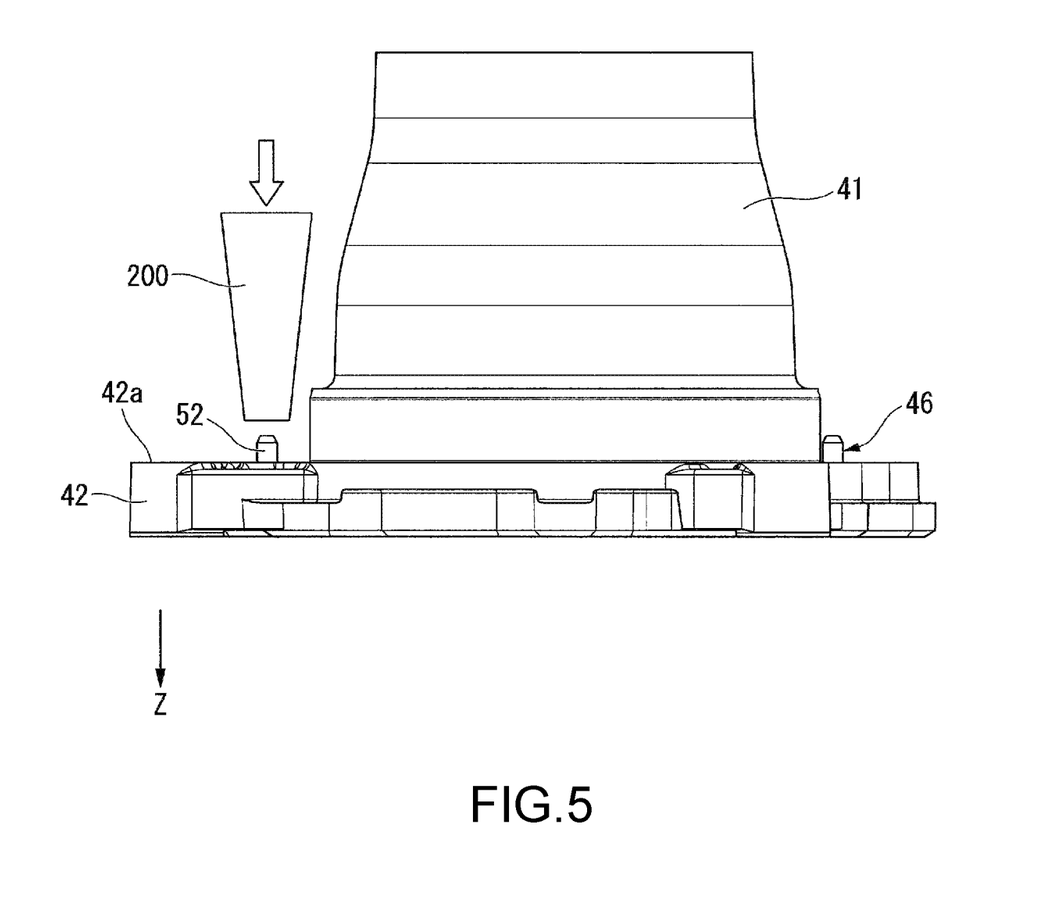
FIG. 5 is a side view showing a part of a housing body portion and a press-fitting jig.

As shown in FIG. 4, the hole portion 51 is disposed in the flange portion body 42b. The hole portion 51 is recessed toward the other side in the axial direction from the end surface 42a of the flange portion 42 facing toward one side in the axial direction. The hole portion 51 has topped circular hole shape. The pin portion 52 is disposed on the flange portion body 42b. The pin portion 52 is fixed to the flange portion 42 by being fitted into the hole portion 51 and protrudes from the end surface 42a toward one side in the axial direction. In other words, the pin portion 52 is fixed to the hole portion 51 by press-fitting. The pin portion 52 has a columnar shape. The convex portion 46 (the positioning portion 46) is a part of the pin portion 52 that protrudes from the end surface 42a toward one side in the axial direction. As shown in FIG. 5, the pin portion 52 is press-fitted into the hole portion 51 by using a pillar-like press-fitting jig 200. The axial length of the press-fitting jig 200 is smaller than the axial length of the housing body portion 41.

According to the embodiment, the convex portion 46 is configured by the pin portion 52. Since the pin portion 52 is press-fitted into the flange portion 42 of the housing 40 instead of the attachment surface 110 of the attached object 100, the pin portion 52 can be precisely erected along the axial direction. That is, the housing 40 is smaller in outer shape and lighter in weight than the attached object 100, and thus the housing 40 is easily handled as a member, and the work of press-fitting the pin portion 52 into the flange portion 42 is easy. Therefore, the press-fitting precision of the pin portion 52 can be stably increased. Accordingly, the assembly becomes easier and the coaxiality between the housing 40 and the recess 101 is improved. In addition, the press-fitting jig 200, the press-fitting equipment or the like for press-fitting the pin portion 52 into the flange portion 42 can be manufactured compactly, simply and inexpensively.

As shown in FIGS. 1 to 4, the attachment hole 48 is disposed in the attachment portion 42c. The attachment hole 48 penetrates through the flange portion 42 in the axial direction. A plurality of attachment holes 48 is arranged, and each attachment hole 48 is disposed in each attachment portion 42c. The screw member 105 is inserted into the attachment hole 48.

Figure 6:
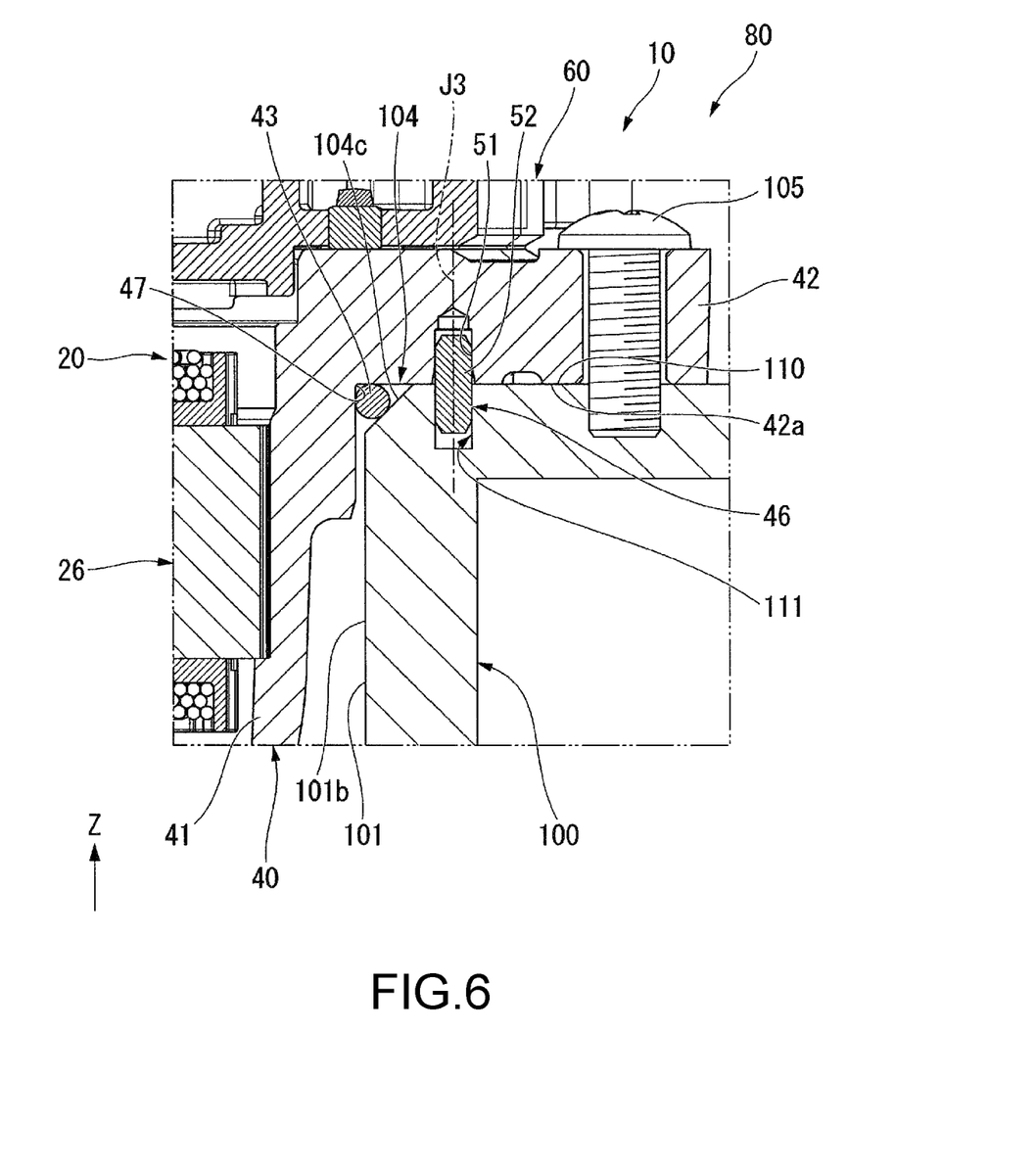
FIG. 6 is a longitudinal cross-section view showing a first variant of the electric pump device and the attachment structure of an electric pump device of the embodiment.

FIG. 6 is a longitudinal cross-section view showing a first variant of the electric pump device 10 and the attachment structure of an electric pump device 80 of the embodiment. In the first variant, the corner portion 104 of the attached object 100 has an inclined surface 104c that is located radially inside toward one side in the axial direction. The seal portion 43 is clamped and disposed between the inclined surface 104c of the corner portion 104 and the corner 47 of the housing 40. In this case, the processing of the corner portion 104 is easy, and the seal performance of the seal portion 43 is stabilized.

Figure 7:
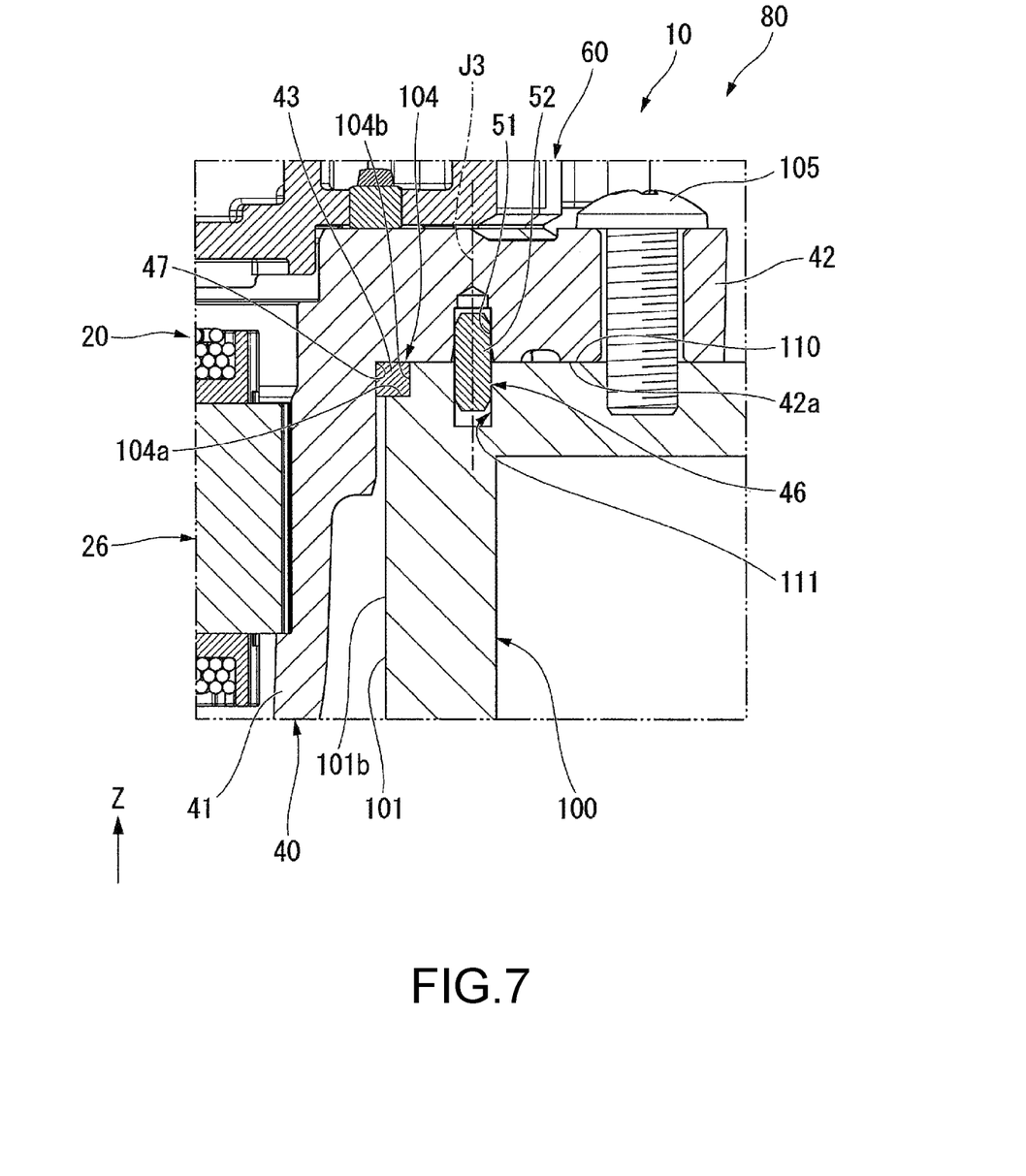
FIG. 7 is a longitudinal cross-section view showing a second variant of the electric pump device and the attachment structure of an electric pump device of the embodiment.

FIG. 7 is a longitudinal cross-section view showing a second variant of the electric pump device 10 and the attachment structure of an electric pump device 80 of the embodiment. In the second variant, the seal portion 43 has a quadrangular cross section along the radial direction. In this case, the posture of the seal portion 43 disposed in the corner portion 104 of the attached object 100 is stabilized. A contact area between the seal portion 43 and the bottom wall 104a and the inner peripheral wall 104b increases. Accordingly, the seal performance of the seal portion 43 is stabilized.

Figure 8:
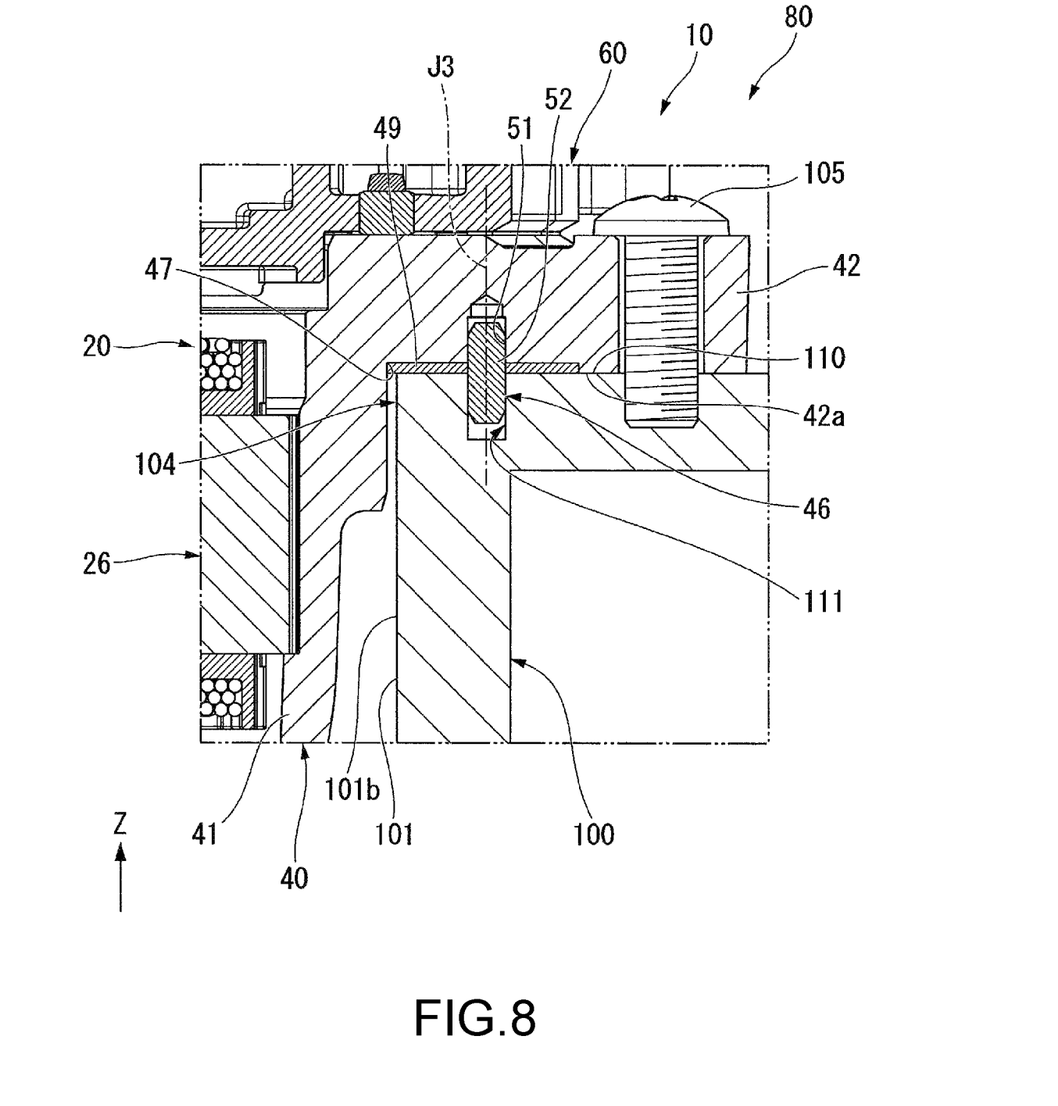
FIG. 8 is a longitudinal cross-section view showing a third variant of the electric pump device and the attachment structure of an electric pump device of the embodiment.

FIG. 8 is a longitudinal cross-section view showing a third variant of the electric pump device 10 and the attachment structure of an electric pump device 80 of the embodiment. In the third variant, the seal portion 49 has a plate shape, and the pair of plate surfaces are facing toward the axial direction. The seal portion 49 has an annular plate shape centered on the first central axis J1. The seal portion 49 is disposed in the corner 47 where the outer peripheral surface of the housing body portion 41 and the end surface 42a of the flange portion 42 facing toward one side in the axial direction are connected. The seal portion 49 is clamped and disposed between the corner portion 104 and the corner 47. The seal portion 49 seals the space between the corner portion 104 and the corner 47. In this case, it is unnecessary to process the corner portion 104 of the attached object 100 for disposing the seal portion 49.

As shown in FIG. 3, the inverter case 60 accommodates the inverter 50. The inverter case 60 has a bus bar holder 61 and a cover 62. The bus bar holder 61 is fixed to the other side in the axial direction of the housing 40. The bus bar holder 61 holds the wiring member 56 and the bus bar 58. The bus bar holder 61 is made, for example, by insert molding using the wiring member 56 and the bus bar 58 as insert members. The bus bar holder 61 has a bottom wall portion 61a, a bearing holder 61e, a ring-like portion 61b, a support portion 61c, and a connector portion 61d.

The bottom wall portion 61a has a plate shape expanding in the direction perpendicular to the first central axis J1. The bottom wall portion 61a is fixed to a surface of the housing 40 facing toward the other side in the axial direction. The bearing holder 61e has a tubular shape and is fixed to the bottom wall portion 61a. The bearing holder 61e is made of metal and holds the second bearing 12. The second bearing 12 is fitted into the bearing holder 61e. The ring-like portion 61b protrudes from the radial outer edge of the bottom wall portion 61a toward the other side in the axial direction. The ring-like portion 61b has a ring shape surrounding the first central axis J1. The support portion 61c is disposed on the radial inner side of the ring-like portion 61b and protrudes from the bottom wall portion 61a toward the other side in the axial direction. A plurality of support portions 61c is arranged. The connector portion 61d is arranged on the radial outer surface of the ring-like portion 61b. As shown in FIG. 2, the connector portion 61d protrudes from the ring-like portion 61b toward a direction of the inter-axis directions from the second central axis J2 to the first central axis J1 (+Y side). For example, an external power supply that supplies electrical power to the stator portion 26 is connected to the connector portion 61d.

As shown in FIG. 3, the cover 62 is fixed to the other side in the axial direction of the bus bar holder 61. The cover 62 has a plurality of fins 62a.

The circuit board 55 has a plate shape in which the plate surface faces toward the axial direction. The circuit board 55 is located on the other side in the axial direction of the stator portion 26. The circuit board 55 is supported from one side in the axial direction by the plurality of support portions 61c, and is fixed to the plurality of support portions 61c by screws. Thereby, the circuit board 55 is supported by the bus bar holder 61. The surface of the circuit board 55 on the other side in the axial direction is located closer to the other side in the axial direction than the ring-like portion 61b.

The wiring member 56 and the bus bar 58 are connected to the circuit board 55. A part of the wiring member 56 is embedded in and held by the bus bar holder 61. The wiring member 56 is an elongated plate-like member. A plurality of wiring members 56 is arranged and the wiring members 56 pass through the inside of the connector portion 61d. The wiring member 56 has a terminal portion (not shown) that is exposed from the connector portion 61d to the outside of the inverter case 60. The wiring member 56 is electrically connected via the terminal portion to the external power supply connected to the connector portion 61d.

A part of the bus bar 58 is embedded in and held by the bus bar holder 61. The bus bar 58 is an elongated plate-like member. A plurality of bus bars 58 are arranged and the bus bars 58 are connected to a lead wire portion 29c extending from the coil 29 toward the other side in the axial direction. Thereby, the wiring members 56 are electrically connected to the stator portion 26 via the circuit board 55 and the bus bars 58.

The inverter 50 is electrically connected to the motor 20. The inverter 50 is attached to the circuit board 55. In the embodiment, the inverter 50 is attached to a surface of the circuit board 55 on one side in the axial direction. The inverter 50 has a plurality of transistors 50a. The transistor 50a is, for example, a field effect transistor. The inverter 50 is electrically connected to the stator portion 26 via the bus bars 58 connected to the circuit board 55.

The capacitor 57 is an electronic component attached to a surface of the circuit board 55 on the other side in the axial direction. The capacitor 57 protrudes from the circuit board 55 toward the other side in the axial direction. The capacitor 57 has a columnar shape extending along a virtual plane (not shown) perpendicular to the first central axis J1. The capacitor 57 is electrically connected to the inverter 50 via the circuit board 55. Thereby, the capacitor 57 is electrically connected to the stator portion 26 via the circuit board 55, the inverter 50, and the bus bars 58.

As shown in FIG. 1, the breather 59 is arranged on the cover 62. The breather 59 has a breathing hole (not shown) and has a function of extracting the air inside the inverter case 60 to the outside through the breathing hole.

Besides, the disclosure is not limited to the above-described embodiment, and as described below for example, changes or the like in the configuration can be made in a range not departing from the gist of the disclosure.

In the above-described embodiment, an example is given in which the pin portion 52 is fixed to the hole portion 51 by press-fitting, and the part of the pin portion 52 that protrudes from the end surface 42a toward one side in the axial direction is set as the convex portion 46 (the positioning portion 46), but the disclosure is not limited hereto. The convex portion 46 and the flange portion 42 may be a part of a single member. In this case, the convex portion 46 is arranged integrally with the flange portion 42 when, for example, the housing body portion 41 is cast.

Moreover, in the range not departing from the gist of the disclosure, the configurations (components) described in the above embodiment, variants, notes and the like may be combined, and configuration addition, omission, substitution and other changes can be made. In addition, the disclosure is not limited by the above embodiment, and is limited only by the scope of the claims.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. An electric pump device, comprising:
a motor having a shaft extending along a central axis, a first bearing and a second bearing;
a pump portion driven by the motor; and
a housing accommodating the motor and the pump portion,
wherein the motor comprises
a rotor portion having the shaft and a rotor core fixed to the shaft, wherein the first bearing supports a part of the shaft that is located closer to an one side an axial direction about the central axis than the rotor core and the second bearing supports a part of the shaft that is located closer to an other side in the axial direction than the rotor core, and
a stator portion facing the rotor portion in a radial direction,
the stator portion comprises
a ring-like stator core centered on the central axis, and
a plurality of coils attached to the stator core;
the coil comprises
a winding portion wound around a part of the stator core, and
a crossover portion connected to the winding portion and connecting the plurality of coils,
the housing comprises:
a housing body portion having a tubular shape and extending in an axial direction, and
a flange portion extending radially outward from an outer peripheral surface of the housing body portion;
the flange portion comprises an end surface that faces toward one side in the axial direction, and the end surface is disposed in the axial direction between a first virtual plane and a second virtual plane and between the first bearing and the second bearing, wherein the first virtual plane passes through a part of the stator core, the winding portion and the crossover portion located closest to the one side in the axial direction and expands in a direction perpendicular to the central axis, and the second virtual plane passes through a part of one of the stator core, the winding portion and the crossover portion that is located closest to the other side in the axial direction and expands in the direction perpendicular to the central axis.

2. The electric pump device according to claim 1, wherein the housing body portion has a sloped portion located closer to the one side in the axial direction than the flange portion, and
the sloped portion has an outer diameter that decreases toward the one side in the axial direction.

3. The electric pump device according to claim 1, wherein the housing body portion has a bottomed tubular shape,
the housing has a protrusion portion extending from a bottom portion of the housing body portion toward the one side in the axial direction, and
the protrusion portion has an elastic ring member that has a ring shape fitted into an outer peripheral surface of the protrusion portion and is elastically deformable.

4. The electric pump device according to claim 2,
wherein the housing body portion has a bottomed tubular shape,
the housing has a protrusion portion extending from a bottom portion of the housing body portion toward the one side in the axial direction, and
the protrusion portion has an elastic ring member that has a ring shape fitted into an outer peripheral surface of the protrusion portion and is elastically deformable.

5. The electric pump device according to claim 1,
wherein the end surface is disposed, in the axial direction, closer to the other side in the axial direction than the stator core.

6. The electric pump device according to claim 2,
wherein the end surface is disposed, in the axial direction, closer to the other side in the axial direction than the stator core.

7. The electric pump device according to claim 3,
wherein the end surface is disposed, in the axial direction, closer to the other side in the axial direction than the stator core.

8. The electric pump device according to claim 4,
wherein the end surface is disposed, in the axial direction, closer to the other side in the axial direction than the stator core.

9. An attachment structure of an electric pump device, comprising:
the electric pump device according to claim 1; and
an attached object to which the electric pump device is attached;
wherein the attached object comprises:
an attachment surface facing toward the other side in the axial direction and in contact with the end surface of the flange portion; and
a recess which is recessed from the attachment surface toward the one side in the axial direction and into which the housing body portion is inserted,
wherein the inner peripheral surface of the recess faces the outer peripheral surface of the housing body portion with a gap in the radial direction.

10. The attachment structure according to claim 9,
wherein the housing body portion has a sloped portion located closer to the one side in the axial direction than the flange portion, and
the sloped portion has an outer diameter that decreases toward the one side in the axial direction.

11. The attachment structure according to claim 9,
wherein the housing body portion has a bottomed tubular shape,
the housing has a protrusion portion extending from a bottom portion of the housing body portion toward the one side in the axial direction, and
the protrusion portion has an elastic ring member that has a ring shape fitted into an outer peripheral surface of the protrusion portion and is elastically deformable.

12. The attachment structure according to claim 10,
wherein the housing body portion has a bottomed tubular shape,
the housing has a protrusion portion extending from a bottom portion of the housing body portion toward the one side in the axial direction, and
the protrusion portion has an elastic ring member that has a ring shape fitted into an outer peripheral surface of the protrusion portion and is elastically deformable.

13. The electric pump device according to claim 9,
wherein the end surface is disposed, in the axial direction, closer to the other side in the axial direction than the stator core.

14. The electric pump device according to claim 10,
wherein the end surface is disposed, in the axial direction, closer to the other side in the axial direction than the stator core.

15. The attachment structure according to claim 11,
wherein the end surface is disposed, in the axial direction, closer to the other side in the axial direction than the stator core.

16. The attachment structure according to claim 12,
wherein the end surface is disposed, in the axial direction, closer to the other side in the axial direction than the stator core.

* * * * *